United States Patent Office  2,900,407
Patented Aug. 18, 1959

2,900,407

PRODUCTION OF SPIRO HETEROCYCLIC DITHIOPHOSPHORIC ACIDS

William M. Lanham, Charleston, W. Va., assignor to Union Carbide Corporation, a corporation of New York No Drawing. Application September 9, 1954
Serial No. 455,090

11 Claims. (Cl. 260—461)

This invention relates to a class of novel spiro heterocyclic dithiophosphoric compounds, and to a novel process for their production.

More especially it concerns the production of novel spiro phosphorus-containing compounds having structures corresponding to the formula:

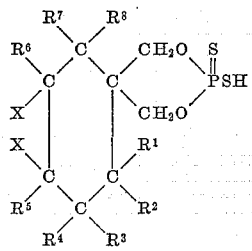

wherein $R^1$, $R^2$, $R^3$, $R^4$, $R^5$, $R^6$, $R^7$ and $R^8$, respectively, designates a radical of the class consisting of hydrogen, the halogens, and the alkyl and aryl radicals; and X designates hydrogen or the two X's taken collectively represent a second bond between the adjacent carbon atoms.

The novel products of this invention are useful as biologically active compounds and as intermediates for the preparation of neutral esters of phosphorus having potential utility as pesticides, plasticizers for synthetic resins, corrosion inhibitors, flotation agents, hydraulic fluids, and petroleum additives.

According to the present invention these novel compounds are made by reacting phosphorus pentasulfide with a 1,3-diol having two methylol groups directly connected to the same carbon atom of either a cyclohexene or a cyclohexane ring, if desired in the presence of an inert diluent. The diols useful as starting materials have structures represented by the formula:

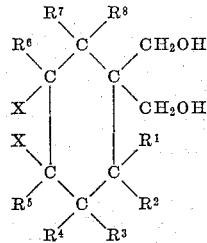

wherein $R^1$, $R^2$, $R^3$, $R^4$, $R^5$, $R^6$, $R^7$, $R^8$ and X have the designations hereinbefore indicated.

While stoichiometric proportions of the two reactants are required, as illustrated by the following representative equation:

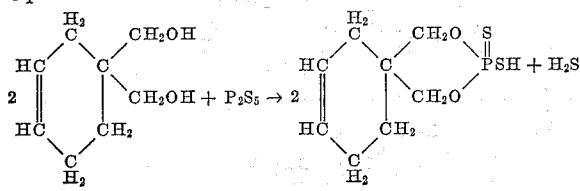

and the use of these proportions of reactants is preferred, an excess of either reactant can also be employed.

The reaction between the phosphorus pentasulfide and the diol proceeds smoothly at temperatures around 70° C. However, reaction temperatures within the range between 10° C. and 125° C. are operative, and even higher temperatures can be used at the possible sacrifice of yields due to side reactions.

While usually the 1,3-diol is added in small successive amounts to an agitated suspension of phosphorus pentasulfide in an inert diluent, the phosphorus pentasulfide can be added in like manner to the diol. When the diol is a high melting solid, or the reaction is conducted at a temperature below its melting point, a solution thereof in an inert solvent is used. Where the diol is a solid melting at or below the reaction temperature used it may be added in the molten state. When the diol is a liquid, no solvent therefor is required.

Suitable inert suspending agents for phosphorus pentasulfide which are also inert solvents for the 1,3-diols used as starting materials include benzene, toluene, the xylenes, ethylene dichloride, heptane, hexane, ethyl ether, butyl ether, and the like.

When conducting the reaction at temperatures around 70° C. it usually is necessary to heat the reaction mixture for 6 to 6.5 hours at this temperature to complete the reaction, whereupon evolution of hydrogen sulfide gas ceases and the mixture becomes homogeneous. The reaction mixture then is filtered, and the filtrate is stripped by distillation under high vacuum, leaving as residue the desired product.

Usually no special purification steps are required. However, the residue product can be purified, if desired, by recrystallization from a suitable solvent such as ethyl ether, or by reacting the residue product with an aqueous solution of an alkali metal hydroxide in the presence of an inert water-immiscible diluent such as ethyl ether to form the alkali metal salt, allowing the mixture to stratify into layers, and treating the aqueous layer thus formed with a mineral acid such as hydrochloric acid or sulfuric acid to regenerate the desired product.

The 1,3-diol starting materials can be made by well known processes, as by a Diels-Alder condensation reaction between a conjugated diene and an alpha, beta-unsaturated aldehyde, followed by the reaction of the resultant aldehyde product with formaldehyde in the presence of an alkali metal hydroxide. Thus the reaction of equimolar amounts of butadiene-1,3 and acrolein yields 3-cyclohexene-1-carboxaldehyde. The latter reacts with formaldehyde and aqueous caustic soda in a 1:2:1 molar ratio to yield 3-cyclohexene-1,1-dimethanol. Catalytic hydrogenation of the latter yields the corresponding cyclohexane-1,1-dimethanol. Similarly, the use of butadiene-1,3 and crotonaldehyde in the Diels-Alder reaction, followed by the treatment with formaldehyde and alkali yields 6-methyl-3-cyclohexene-1,1-dimethanol. The use of 1-phenylbutadiene-1,3 and acrolein in the same reaction, followed by the treatment with formaldehyde and alkali yields 2-phenyl-3-cyclohexene-1,1-dimethanol; and the corresponding reaction of chloroprene and acrolein followed by the formaldehyde and alkali treatment yields 4-chloro-3-cyclohexene-1,1-dimethanol. By the catalytic hydrogenation of these cyclohexene derivatives the corresponding cyclohexane derivatives are obtained. By employing various conjugated dienes and alpha, beta-unsaturated aldehydes a large variety of 1,3-diols can be prepared. Thus, 2-methyl-1,3-pentadiene, crotonaldehyde and formaldehyde yield 2,4,6-trimethyl-3-cyclohexene-1,1-dimethanol. Starting with isoprene and crotonaldehyde, 4,6-dimethyl-3-cyclohexene-1,1-dimethanol is produced. The 4-chloro-6-methyl-3-cyclohexene-1,1-dimethanol is made when starting with chloroprene and crotonaldedyde. Diols-1,3 of this type, and their corresponding substituted cyclohexane diol derivatives, are useful in the process.

The following examples will serve to illustrate the invention:

Example 1

During 25 minutes a solution of 50 grams (0.352 mol) of 3-cyclohexene-1,1-dimethanol in 300 cc. of ethylene dichloride was added dropwise to an agitated suspension of 39 grams (0.176 mol) of phosphorus pentasulfide in 50 cc. of ethylene dichloride, with heating to maintain a reaction temperature of 70° C. Thereafter the mixture was heated at 70° C. for an additional 6.25 hours, at which time hydrogen sulfide evolution ceased. The reaction mixture was filtered, and the filtrate was stripped by distillation to a kettle temperature of 25° C. under less than 18 mm. of mercury pressure. To the residual mixture of liquids and solids was added 150 cc. of ethyl ether. This ethereal suspension of the product was cooled to −25° C. and filtered. The crystals thus obtained were stripped by distillation at 25° C. under less than 18 mm. of mercury pressure to yield 31 grams of spiro [(2-mercapto - 2 - thiono - 1,3,2 - dioxaphosphorinane) - 5,4'-cyclohexene] as a dry white crystalline product having a melting point of 98°–100° C.; a percent purity (by acidity determination) of 97.5%; and the following analysis:

|   | Analysis, percent by weight | |
|---|---|---|
|   | Found | Theory |
| C | 41.70 | 40.63 |
| H | 5.80 | 5.55 |
| P | 13.38 | 13.10 |
| S | 26.2 | 27.12 |

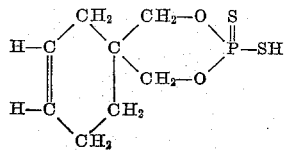

Example 2

During 30 minutes a solution of 72 grams (0.5 mol) of cyclohexane-1,1-dimethanol in 400 cc. of ethylene dichloride was added dropwise to an agitated suspension of 55.5 grams (0.25 mol) of phosphorus pentasulfide in 100 cc. of ethylene dichloride, while heating to maintain the mixture at 70° C. After heating at 70° C. for an additional 6 hours, evolution of hydrogen sulfide had ceased. The reaction mixture was filtered, and the filtrate was stripped by distillation to 25° C. under a pressure of less than 25 mm. of mercury. The resultant residue was agitated with 100 cc. of ethyl ether, and the ethereal suspension was cooled to −25° C. and filtered. The crystals thus obtained were stripped by distillation at 25° C. under less than 20 mm. of mercury pressure, again agitated at 25° C. with 200 cc. of ethyl ether, and this ethereal suspension was filtered at 25° C. The resulting crystals were stripped by distillation at 25° C. under less than 20 mm. of mercury pressure, yielding 49 grams of spiro [(2-mercapto-2-thiono-1,3,2-dioxaphosphorinane)-5,1'-cyclohexane] as a dry, white solid having a purity of 98.4% (by acidity determination); and having the following analysis:

|   | Analysis, percent by weight | |
|---|---|---|
|   | Found | Theory |
| C | 40.38 | 40.34 |
| H | 6.59 | 6.34 |
| P | 13.31 | 12.98 |
| S | 26.40 | 26.89 |

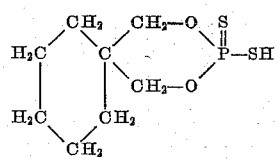

Example 3

During 10 minutes 61 grams (0.33 mol) of 2,4,6-trimethyl-3-cyclohexene-1,1-dimethanol were added dropwise to an agitated suspension of 37 grams (0.165 mol) of phosphorus pentasulfide in 100 cc. of xylene, with heating to maintain the reaction mixture at 70° C. during this time and for an additional 6.5 hours, while removing hydrogen sulfide as evolved. The reaction mixture was filtered; and the filtrate was stripped by distillation to a kettle temperature of 100° C. under a pressure of less than 3 mm. of mercury. Thus were obtained 85 grams, a 92% yield, of spiro[(2-mercapto-2-thiono-1,3,2-dioxaphosphorinane)-5,4'-(1',3',5'-trimethylcyclohexene)] as a solid residue having a melting point of 124°–130° C. and the following analysis:

|   | Analysis, percent by weight | |
|---|---|---|
|   | Found | Theory |
| C | 47.50 | 47.44 |
| H | 6.90 | 6.88 |
| P | 11.39 | 11.12 |
| S | 21.6 | 23.02 |

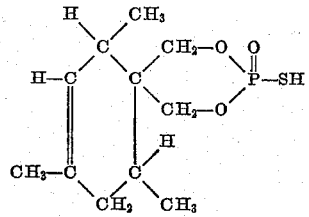

Example 4

During 15 minutes 78.5 grams (0.5 mol) of 6-methyl-3-cyclohexene-1,1-dimethanol, held at 50° C., were added dropwise to an agitated suspension of 55.5 grams (0.25 mol) of phosphorus pentasulfide in 100 cc. of toluene, while heating the reaction mixture at 70° C. and for an additional 6 hours. The reaction mixture then was filtered; and the filtrate was stripped by distillation to a kettle temperature of 100° C. under a pressure of less than 2 mm. of mercury. The residual products, spiro-[(2 - mercapto - 2 - thiono - 1,3,2 - dioxaphosphorinane)-5,4'-(5'-methylcyclohexene)] was obtained in the form of a brown glassy solid melting at 233° C. with decomposition and having the following analysis in percent by weight:

Percent C=43.49 (theory=43.17);
Percent H=6.17 (theory=6.04);
Percent P=12.49 (theory=12.37);
Percent S=24.1 (theory=25.61);
Percent purity (by acidity determination)=97.3;
Yield 95%.

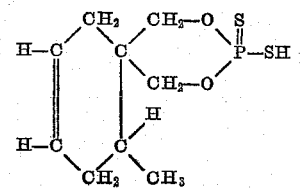

Example 5

During 30 minutes 33 grams (0.15 mol) of phosphorus pentasulfide were added to an agitated suspension of 53 grams (0.3 mol) of 4-chloro-3-cyclohexene-1,1-dimethanol in 100 cc. of xylene held at 90° C. After evolution of hydrogen sulfide had ceased the reaction mixture was diluted with 100 cc. of xylene and filtered at 90° C. The filtrate was cooled to 25° C. and filtered and the residue was agitated with 200 cc. of ethyl ether, cooled to −10° C. and filtered. The residue therefrom was stripped by distillation to a kettle temperature of 40° C. under a pressure of less than 2 mm. of mercury. The residual spiro[(2-mercapto-2-thiono-1,3,2-dioxaphosphorinane)-5,4′-(1′-chlorocyclohexene)] was recovered as a white solid having a melting point of 144°–147° C. Analysis showed 11.62% of phosphorus (theory=11.44%); 13.04% of chlorine; 22.50% of sulfur; 36.73% of carbon, and 4.60% of hydrogen.

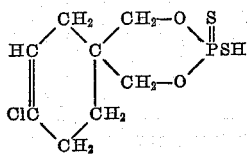

Similarly, the reaction of phosphorus pentasulfide with the following diols in accordance with the process of the invention yield the spiro compounds designated:

| Dimethanol derivatives | Resultant products |
|---|---|
| 1. [2-phenyl-3-cyclohexene-1,1-dimethanol. | Spiro[(2-mercapto-2-thiono-1,3,2-dioxaphosphorinane)-5,4′-(3′-phenylcyclohexene)]. |
| 2. 2-methyl-2-phenyl-3-cyclohexene-1,1-dimethanol. | Spiro[(2-mercapto-2-thiono-1,3,2-dioxaphosphorinane)-5,4′-(3′-methyl-3′-phenyl-cyclohexene)]. |
| 3. 4-chloro-3-cyclohexene-1,1-dimethanol. | Spiro[(2-mercapto-2-thiono-1,3,2-dioxaphosphorinane)-5,4′-(1′-chlorocyclohexene)]. |
| 4. 3-chloro-6-methyl-3-cyclohexene-1,1-dimethanol. | Spiro[(2-mercapto-2-thiono-1,3,2-dioxaphosphorinane)-5,4′-(2′-chloro-5′-methylcyclohexene)]. |
| 5. 2,5-diphenyl-6-methyl-3-cyclohexene-1,1-dimethanol. | Spiro[(2-mercapto-2-thiono-1,3,2-dioxaphosphorinane)-5,5′-(3′,6′-diphenyl-4′-methylcyclohexene)]. |
| 6. 2-phenylcyclohexane-1,1-dimethanol. | Spiro[(2-mercapto-2-thiono-1,3,2-dioxaphosphorinane)-5,1′-(2′-phenylcyclohexane)]. |

Among other 1,3-diols useful in the process are:

2-methyl-3-cyclohexene-1,1-dimethanol;
4-methyl-3-cyclohexene-1,1-dimethanol;
2-ethyl-3-cyclohexene-1,1-dimethanol;
2-butyl-3-cyclohexene-1,1-dimethanol;
4-bromo-3-cyclohexene-1,1-dimethanol;
4-phenyl-3-cyclohexene-1,1-dimethanol;
6-methyl-2-phenyl-3-cyclohexene-1,1-dimethanol;
2,6-dimethyl-2-phenyl-3-cyclohexene-1,1-dimethanol;
3-chloro-3-cyclohexene-1,1-dimethanol;
4-chloro-6-methyl-3-cyclohexene-1,1-dimethanol;
2,5-diphenyl-3-cyclohexene-1,1-dimethanol;
3,4-diphenyl-3-cyclohexene-1,1-dimethanol;
3,4-diphenyl-6-methyl-3-cyclohexene-1,1-dimethanol;
3-chloro-4-methyl-3-cyclohexene-1,1-dimethanol;
4-chloro-3-methyl-3-cyclohexene-1,1-dimethanol;
3-chloro-4,6-dimethyl-3-cyclohexene-1,1-dimethanol;
3,4-dichloro-3-cyclohexene-1,1-dimethanol; and the corresponding substituted cyclohexane-1,1-dimethanols.

The invention is susceptible of modification within the scope of the appended claims.

I claim:
1. As new compounds, spiro heterocyclic dithiophosphoric acids having structures corresponding to the formula:

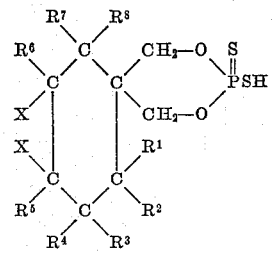

wherein $R^1$, $R^2$, $R^3$, $R^4$, $R^5$, $R^6$, $R^7$ and $R^8$, respectively, designates a radical of the class consisting of hydrogen, the chlorine, bromine, and the lower alkyl and phenyl radicals; and each X designates hydrogen and the two X's collectively represent a second bond between the adjacent carbon atoms.

2. As new compounds, spiro heterocyclic dithiophosphoric acids of the formula

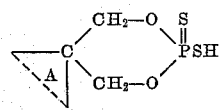

where

designates a radical of the class consisting of (1) the unsubstituted cyclohexen-4-ylidene radicals; (2) the cyclohexen-4-ylidene radicals substituted upon at least one of the ring carbon atoms with at least one member of the class consisting of the chlorine, bromine, lower alkyl and phenyl radicals; (3) the unsubstituted cyclohexylidene radicals; and (4) the cyclohexylidene radicals substituted upon at least one of the ring carbon atoms with at least one member of the class consisting of the chlorine, bromine, lower alkyl and phenyl radicals.

3. As new compounds, the spiro[(2-mercapto-2-thiono-1,3,2-dioxaphosphorinane)-5,4′-cyclohexenes].

4. As new compounds, the spiro[(2-mercapto-2-thiono-1,3,2-dioxaphosphorinane)-5,4′-cyclohexenes] substituted on at least one carbon atom of the cyclohexene ring by at least one lower alkyl group.

5. As new compounds, the spiro[(2-mercapto-2-thiono-1,3,2-dioxaphosphorinane)-5,4′-cyclohexenes] substituted on at least one carbon atom of the cyclohexene ring by at least one halogen atom.

6. As new compounds, the spiro[(2-mercapto-2-thiono-1,3,2-dioxaphosphorinane)-5,1′-cyclohexanes].

7. As new compounds, the spiro[(2-mercapto-2-thiono-1,3,2-dioxaphosphorinane)-5,1′-cyclohexanes] substituted on at least one carbon atom of the cyclohexane ring by at least one lower alkyl group.

8. Process for preparing spiro heterocyclic dithiophosphoric acids having the structure:

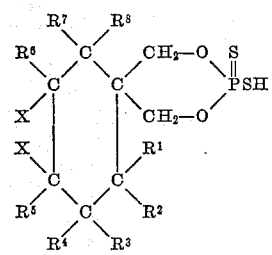

wherein $R^1$, $R^2$, $R^3$, $R^4$, $R^5$, $R^6$, $R^7$ and $R^8$, respectively, designates a radical of the class consisting of hydrogen, chlorine, bromine, and the lower alkyl and phenyl radicals; and each X designates hydrogen, and two X's collectively represent a second bond between the adjacent carbon atoms; which process comprises reacting phosphorus pentasulfide with a 1,3-diol having a structure corresponding to the formula:

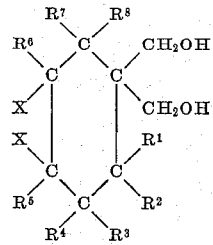

wherein $R^1$, $R^2$, $R^3$, $R^4$, $R^5$, $R^6$, $R^7$, $R^8$ and X have the aforesaid meanings.

9. Process as defined in claim 8 wherein one of the reactants is fed in small successive amounts to a liquid body containing the other of said reactants.

10. Process as defined in claim 8 wherein one of the reactants is fed in small successive amounts to a liquid body containing the other of said reactants and an inert solvent for the spiro product.

11. Process for producing spiro heterocyclic dithiophosphoric acids having the structure:

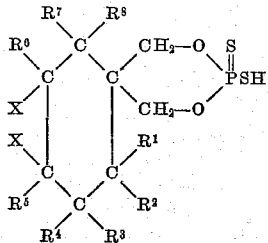

wherein $R^1$, $R^2$, $R^3$, $R^4$, $R^5$, $R^6$, $R^7$ and $R^8$, respectively, designates a radical of the class consisting of hydrogen, chlorine, bromine, and the lower alkyl and phenyl radicals; and each X designates hydrogen and two X's collectively represent a second bond between the adjacent carbon atoms; which process comprises reacting phosphorus pentasulfide with a 1,3-diol having a structure corresponding to the formula:

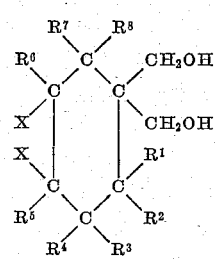

wherein $R^1$, $R^2$, $R^3$, $R^4$, $R^5$, $R^6$, $R^7$, $R^8$ and X have the aforesaid meanings, at temperatures in the range from about $+10°$ C. to about $125°$ C., and removing by-product hydrogen sulfide as formed.

No references cited.